Feb. 10, 1948.   C. A. TILESTON   2,435,660
CABLE STRIPPING DEVICE
Filed July 23, 1945   4 Sheets-Sheet 1

INVENTOR.
Clarence A. Tileston
BY
AGENT.

Feb. 10, 1948.  C. A. TILESTON  2,435,660
CABLE STRIPPING DEVICE
Filed July 23, 1945  4 Sheets-Sheet 2

INVENTOR.
Clarence A. Tileston
BY
AGENT.

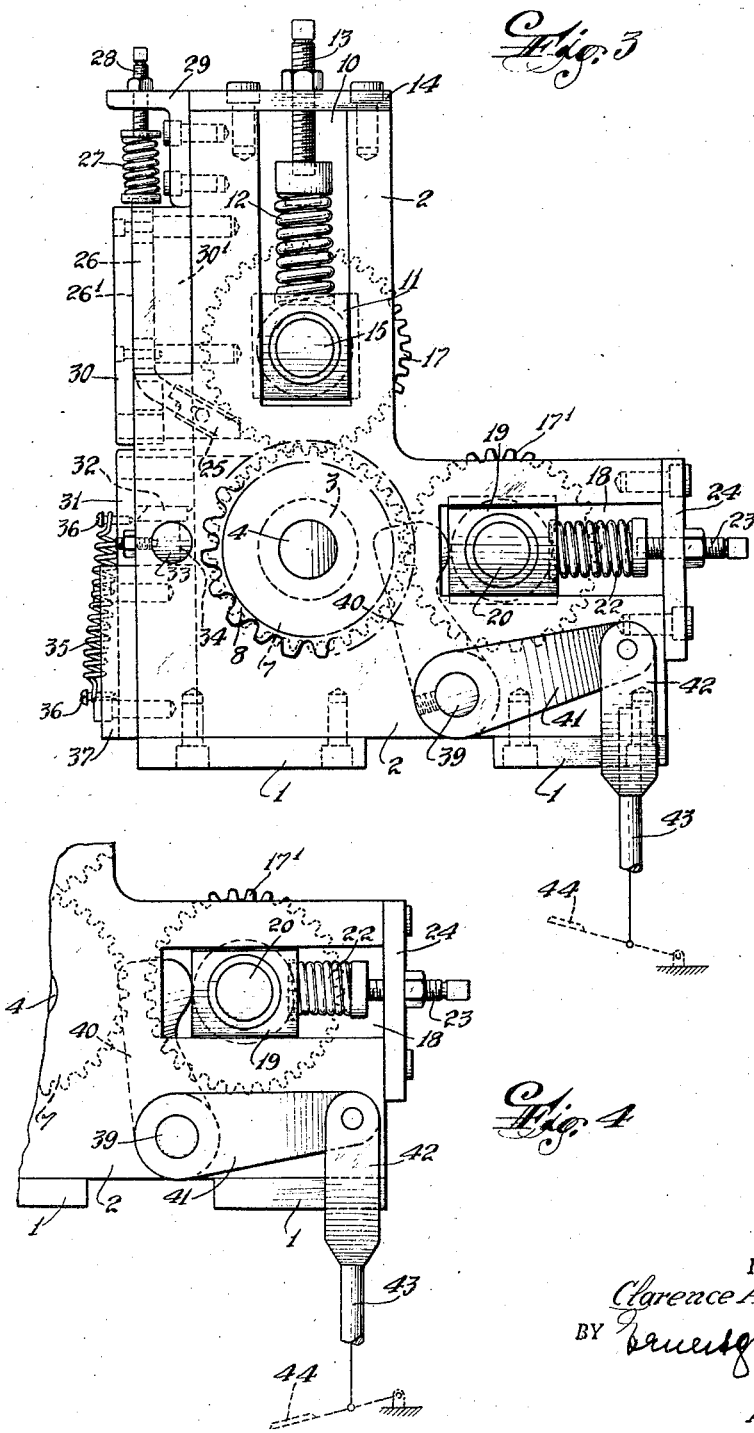

Feb. 10, 1948.   C. A. TILESTON   2,435,660
CABLE STRIPPING DEVICE
Filed July 23, 1945   4 Sheets-Sheet 4

INVENTOR.
Clarence A. Tileston
BY
AGENT.

Patented Feb. 10, 1948

2,435,660

UNITED STATES PATENT OFFICE 2,435,660

CABLE STRIPPING DEVICE

Clarence A. Tileston, Glen Rock, N. J., assignor to Federal Telephone and Radio Corporation, New York, N. Y., a corporation of Delaware Application July 23, 1945, Serial No. 606,691

10 Claims. (Cl. 164—39)

This invention relates to a cable stripping device and particularly to a device capable of stripping off insulating material, metal braid or any other layer arranged around the conductor of a cable.

It is desirable to save the material of cables, for example of high frequency cables, which do not show the desired characteristics and in order to enable the re-use of each one of the materials used in the manufacturing process of cables, it is preferable to strip off each layer of the used materials separately.

It is, therefore, the main object of the present invention to provide means for stripping off different layers of a cable by providing guiding means for the cable behind a knife member and further means for separately removing the cable core and the layers stripped off the cable.

It is another object of the present invention to provide two pairs of wheels of predetermined profile chosen in accordance with the cross-sections of the cable to be stripped off, one pair serving as a guide member for the cable and the other pair as a guide member for the layer which has been stripped off.

It is still a further object of the present invention to provide three wheels of predetermined profile in accommodation to the cross sections of the cable to be stripped off, one wheel cooperating with each of the other wheels in guiding the cable and the layers stripped off the cable, respectively.

It is still another object of the present invention to provide means for adjustably spacing the pair of wheels which serves the purpose of removing the layer stripped off the cable.

With these and other objects in view the present invention will become apparent and clearly understood in the following specification in connection with the accompanying drawings, in which:

Fig. 3 is a right end view of the device shown in Fig. 1;

Figure 1:
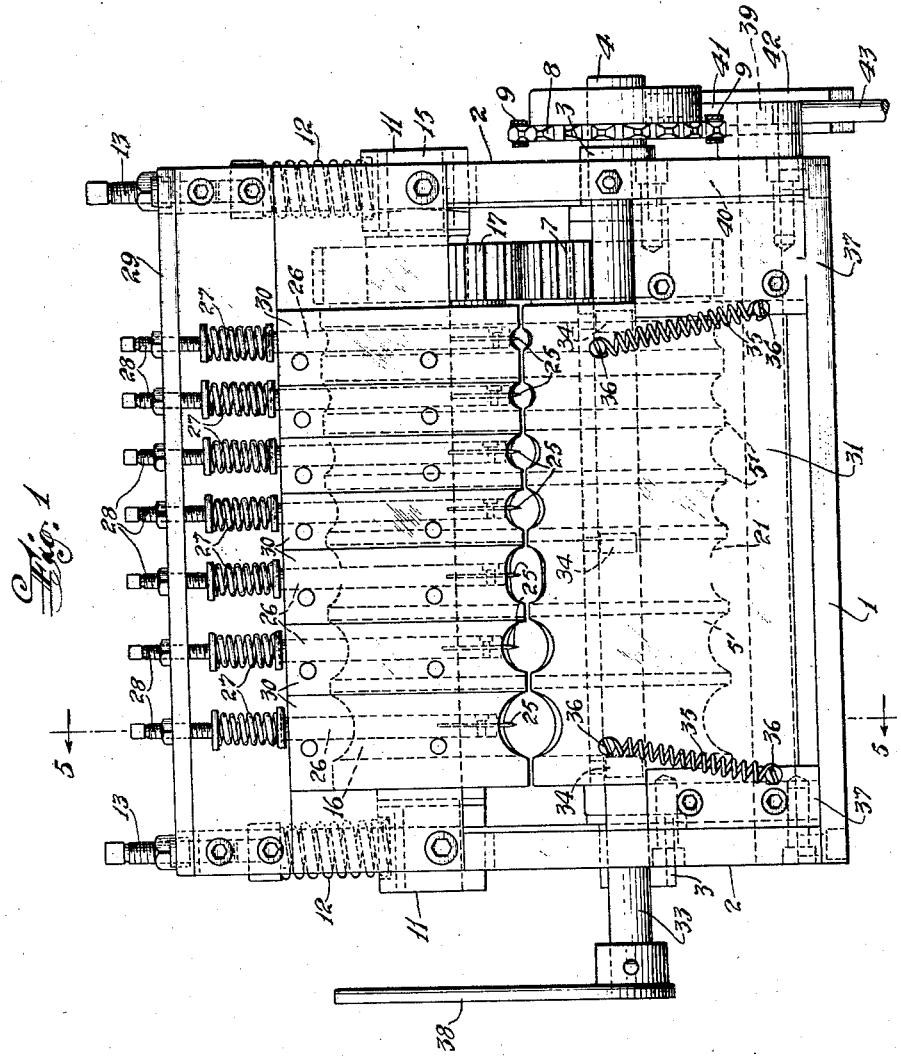
Figure 1 is an elevational front view of the cable stripping device.
Figure 2:
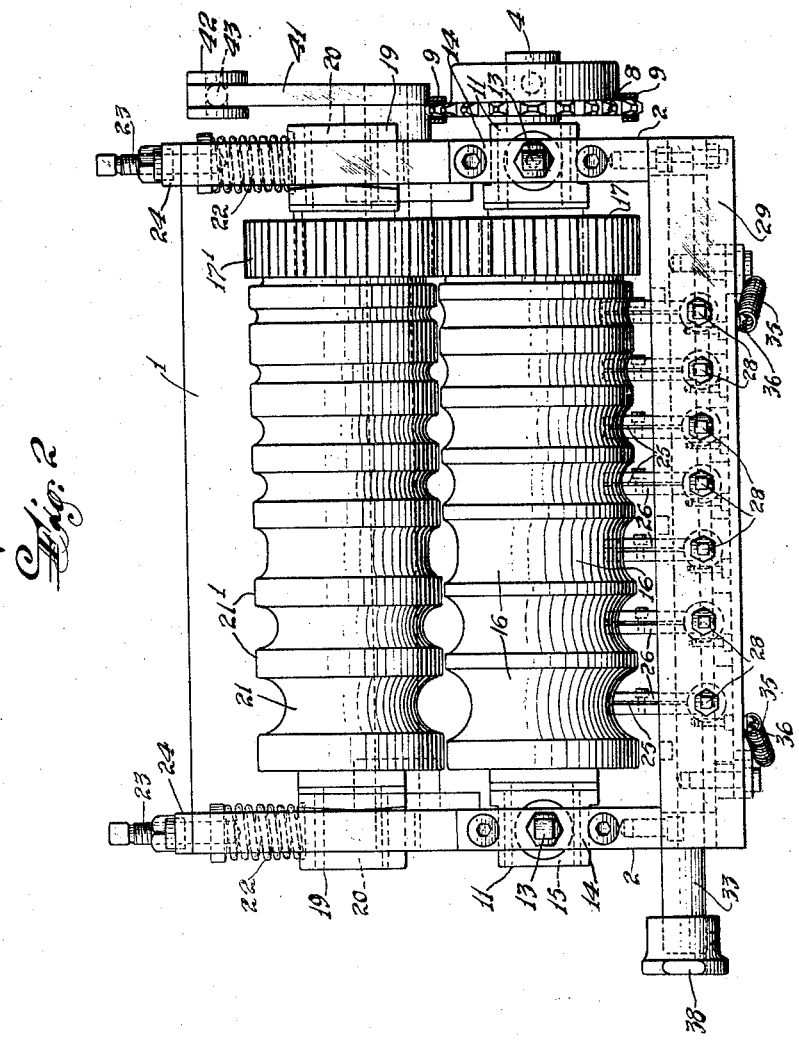
Fig. 2 is a plan view of the device shown in Fig. 1.
Figure 5:
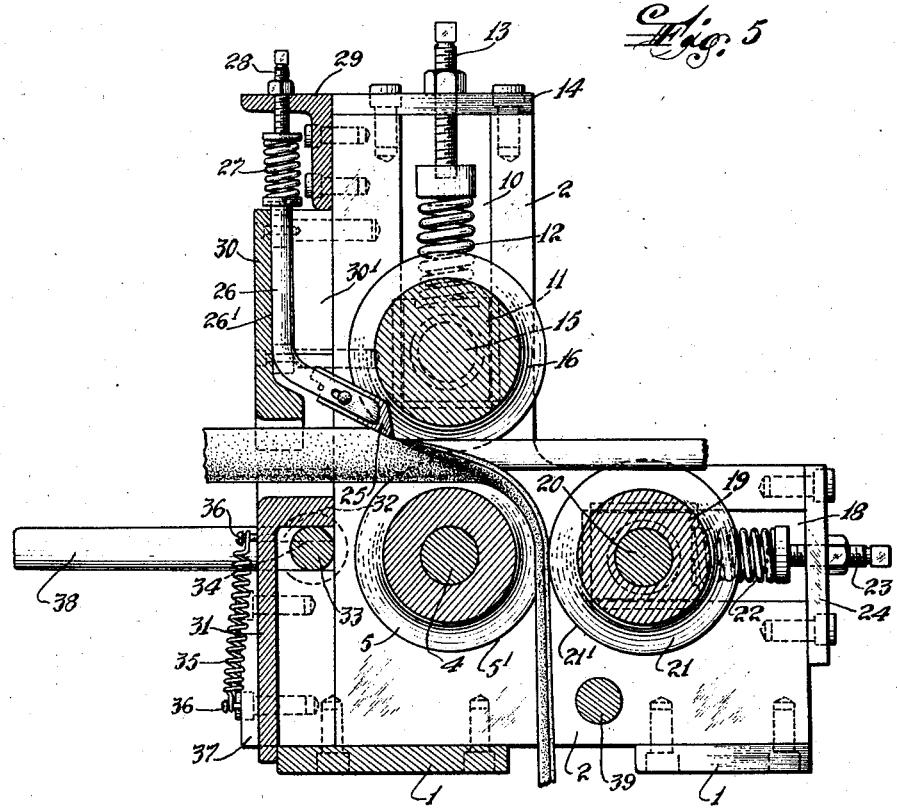

Fig. 4 discloses the means for adjustably spacing two cooperating wheels, guiding the layer stripped off the cables; and Fig. 5 is a cross section through the device along the lines 5—5 of Fig. 1.

Referring now to the drawings, the device consists of a base frame 1 on which two side frames 2 are properly mounted. The side frames 2 are equipped with bearings 3 for a shaft 4 which carries a wheel 5. The wheel 5 is equipped with a number of different profiles 6 in order to use the same wheel 5 for cables of different cross section. One end of the shaft 4 carries a tooth gear 7 and a sprocket wheel 8 is fastened to an extension of the shaft 4 which sprocket wheel 8 is driven by a sprocket chain 9 by any known driving means.

Both side frames 2 are equipped with a vertical slot 10 which slots are adapted to receive a bearing 11 slidable in the slots 10 in vertical direction. Springs 12 which are adjustable by threaded bolts 13 are arranged on top of the bearings 11, which springs 12 tend to press the bearings 11 into their lowest position. The threaded bolts 13 are inserted in cross bars 14 fastened to the top of the side frames 2. The bearings 11 are adapted to carry a shaft 15 on which another wheel 16 is mounted, which wheel 16 is also profiled for cables of different cross sections in such a way that the profiles of the wheels 5 and 16 together form an open space of about the different cross sections of the cables. One end of the shaft 15 carries a tooth gear 17 which is normally in mesh with the tooth gear 7 of the wheel 5. The teeth of the gears 7 and 17 are of such a height that the two gears 7 and 17 remain in mesh even if gear 17 is lifted somewhat together with the wheel 16 against pressure of the spring 12, which lifting might occur when an irregular thicker part of the cable runs through the space between the wheels 5 and 16.

As seen in Fig. 3, the side frames 2, which are shown in the approximate shape of a right angle are equipped with another slot 18, in the horizontally extending position. The slots 18 are adapted to receive bearings 19 carrying a shaft 20 on which a third wheel 21 is mounted which also is profiled either somewhat like the wheels 5 and 16, or may be of cylindrical shape throughout its entire length, since even when profiled the cylindrical outer faces 5' and 21', respectively, of the wheels 5 and 21 serve as rotating clamping means for removal of the stripped off layer of the cable. In order to improve the grip of the cylindrical faces 5' and 21' on the stripped layer, they are preferably provided with a roughened surface and the wheels 5 and 21 preferably turn with somewhat different speed in order to achieve proper stress in the stripped off material. The position of the three wheels 5, 16 and 21 is chosen in such a way that conforming profiles of the different wheels are arranged opposite each other. A spring 22 tends to keep the bearing 19 at the bottom of the slot 18 by means of a threaded bolt 23 screwed again into cross bars 24 which close up the slot 18 and are mounted on the end of the side frames 2.

A knife or blade 25, is arranged in front of the wheel 16 just above the open space formed by the wheels 5 and 16. The same number of blades are provided as profiles are arranged on the wheels 5 and 16. The blades are carried by special partly bent holders 26 which slide in vertical direction in a slot 26'. A spring 27 pressing against the top of the holders 26 tends to keep the holders 26 and thereby the blades 25 in their lowest position through an adjustable abutment in the form of a threaded bolt 28 which is inserted into an angular member 29 attached to the side frame 2. A number of upper front plates 30 which are screwed to but spaced from an extension 30' of the side frames 2 form the slot 26' for guiding the holders 26 to allow the individual insertion or adjustment of each one of the blade holders 26. The lower end of each of the front plates 30 has a cut-out conforming with each one of the profiles of the wheels 16.

Whereas each front plate 30 covers one of the blade holders 26 so that all plates together cover the entire upper wheel 16 (Figs. 1 and 5), one single lower cover plate 31 only is provided which covers entirely the lower wheel 5. The lower cover plate 31 is equipped with preferably three extensions 32 directed toward the lower wheel 5, which extensions 32 rest on a shaft 33 turnably mounted in the side frames 2. The shaft 33 is preferably on three places, namely just below the three extensions 32 of the cover plate 31, equipped with flats 34. Springs 35, one end of each of which is attached to a respective screw 36 mounted in extension 37 of the side frames 2, whereas its other end is attached to a screw 36 mounted near the upper end of the plate 31, tend to keep the lower cover plate 31 in abutment position between the extensions 32 and the shaft 33. The top of the cover plate 31 is also equipped with profiles corresponding with the profiles provided at the lower end of the upper cover plates 30. One end of the shaft 33 carries a handle 38 and by turning the shaft 33 90° from its normal position by means of handle 38, in which the flats 34 are in vertical position, to a position in which they are transferred into horizontal position, the extension 32 will be lowered down to the flats 34 by means of the springs 35, thereby lowering the entire cover plate 31. By these means the space between the upper and lower cover plates is enlarged somewhat in order to enable the insertion of a cable into the space between the lower and upper wheels 5 and 16, to adjust properly an inserted cable, or to assist in removing material which may have jammed. The original higher position of the lower cover plate 31 can be easily reached again by turning the handle 38 for 90° back to its previous position, thereby raising again the cover plate 31 against action of the springs 35.

As shown in Figs. 3 and 4, special means are provided for separating the two lower wheels 5 and 21 when the strip of layer is the first time inserted between the wheels. As stated before, the side frames are equipped with a lateral slot 18 in which the bearing 19 can move against pressure of the spring 22. In order to achieve this end, another shaft 39 is mounted in the side frames 2 which shaft 39 carries preferably two arms 40 abutting against the bearings. A link 41 keyed on the shaft 39 is connected with a bifurcated end piece 42 of a bar 43 which, by example can lead to a foot pedal 44, schematically shown in Fig. 3. It can be seen that by pulling the bar 43 the arms 40 will press the bearings 19 in the slot 18 against pressure of the spring 22 into the position shown in Fig. 4, thereby moving away the shaft 20 and also the wheel 16 from the other wheel 5, in which position the layer stripped off the cable can be inserted between the wheels 5 and 16 and upon release of the foot pedal 44 the spring 22 will return immediately the wheel 16 into contact with wheel 5.

While I have disclosed the principles of my invention in connection with a single embodiment, it will be understood that this embodiment is given by way of example only and not as limiting the scope of the invention as set forth in the objects and the appended claims.

What I claim is:

1. In a device for stripping a cable, a frame, three parallelly arranged wheels mounted on said frame, means for urging two of said wheels toward the third of said wheels, one of said two wheels together with said third one forming a first pair of wheels adapted to serve as a guide for the cable and the other of the two wheels together with said third wheel forming a second pair of said wheels adapted to serve as a feed guide for the layer stripped off the cable, and a knife member mounted in front of the said first pair of said wheels and adapted for splitting a layer of the cable to be stripped off.

2. In a device, as set forth in claim 1, a plurality of profiles on each one of the wheels of the said first pair, the said profiles of the two adjacent wheels forming a plurality of different open spaces according to the varying cross-sectional size of cable layers.

3. In a device, as set forth in claim 1, a plurality of substantially cylindrical faces on each one of the wheels of the said second pair, said faces being arranged opposite each other on the respective wheels and between two adjacent profiles for cables of different cross section on said third wheel, said cylindrical faces being adapted to serve as rotating clamping means for a stripped off layer.

4. In a device, as set forth in claim 1, means for separating the wheels of the said second pair of wheels in order to insert a layer stripped off the cable between the said wheels.

5. In a device for stripping a cable, a frame comprising two parallel extending walls, a first wheel rotatably mounted between said walls, slots in said wall directed toward the center of said wheel, two additional wheels mounted parallel to the first wheel in said slots of the walls, spring members in said slots pressing said two additional wheels toward said first mentioned wheel, the latter with each one of the said additional wheels forming two pairs of wheels, the first of said pairs being adapted as a guide for the cable to be stripped and the second of the said pairs being adapted as a guide for the layer stripped off the cable, a knife member in front of said first pair of wheels adapted to split at least one layer of said cable, a spring member pressing said knife member into its down position against the cable to be stripped, and means for separating the wheels of said second pair in order to insert the stripped off layer between said wheels.

6. In a device as set forth in claim 5, a plurality of profiles in each of the wheels of said first pair in order to receive cables of different cross sections in the respective open spaces of the said first pair of wheels.

7. In a device, as set forth in claim 5, a plurality of substantially cylindrical faces in each of the wheels of the said second pair, said faces being arranged between two adjacent profiles of different cross sections on the said third wheel, and said faces being adapted to serve as rotating clamping means for a stripped off layer.

8. In a device as set forth in claim 5, a plurality of upper cover plates and at least one lower cover plate, the lower margin of said upper plates and the upper margin of said lower plate forming together a plurality of different profiles in accordance with cables of different cross section, said cover plates being mounted in front of and adjacent to said first pair of plates.

9. In a device as set forth in claim 5, a plurality of upper cover plates and at least one lower cover plate, the lower margin of said upper plates and the upper margin of said lower plate forming together a plurality of different profiles in accordance with cables of different cross sections, said cover plates being mounted in front of and adjacent to said first pair of wheels, and means for separating said plates.

10. In a device, as set forth in claim 5, a plurality of upper cover plates and at least one lower cover plate, the lower margin of said upper plate and the upper margin of said lower plate forming together a plurality of different profiles in accordance with cables of different cross sections, said cover plates being mounted in front of and adjacent to said first pair of wheels, at least one extension on said lower plate, a shaft supporting said extensions mounted in said walls, at least one flat on said shaft arranged beneath said extension of the lower plate, springs pressing said extensions against said shaft, said flat being adapted to lower said extension and thereby the said lower plate upon turning of said shaft 90° from the higher position in which said extension is resting in the circular portion of said shaft to the lower position in which said extension is resting on the flat portion of said shaft.

CLARENCE A. TILESTON.

REFERENCES CITED

The following references are of record in the file of this patent:

UNITED STATES PATENTS

| Number | Name | Date |
|---|---|---|
| 429,292 | Thatcher | June 3, 1890 |
| 1,656,755 | Palmer | Jan. 17, 1928 |

FOREIGN PATENTS

| Number | Country | Date |
|---|---|---|
| 834,809 | France | Sept. 5, 1938 |